(12) United States Patent
Kajiwara et al.

(10) Patent No.: US 12,233,834 B2
(45) Date of Patent: Feb. 25, 2025

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Yugo Kajiwara, Wako (JP); Yuichi Masukake, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 227 days.

(21) Appl. No.: 17/978,307

(22) Filed: Nov. 1, 2022

(65) Prior Publication Data

US 2023/0145724 A1 May 11, 2023

(30) Foreign Application Priority Data

Nov. 5, 2021 (JP) .................. 2021-181042

(51) Int. Cl.
  *B60T 7/12* (2006.01)
  *B60Q 9/00* (2006.01)
(52) U.S. Cl.
  CPC .................. *B60T 7/12* (2013.01); *B60Q 9/00* (2013.01); *B60T 2210/32* (2013.01)
(58) Field of Classification Search
  CPC ......... B60T 7/12; B60T 2210/32; B60Q 9/00; B60Q 1/52; B60Q 5/005; B60W 30/17; B60W 50/14; B60W 40/09; B60W 30/08; G05D 1/0055
  See application file for complete search history.

(56) References Cited

U.S. PATENT DOCUMENTS

| 2017/0158054 A1 | 6/2017 | Munaoka et al. |
| 2018/0029604 A1* | 2/2018 | Niino .................. B60W 30/181 |
| 2021/0016783 A1* | 1/2021 | Watanabe ....... B60W 30/18154 |
| 2021/0103279 A1* | 4/2021 | Ide ..................... B60W 50/082 |

FOREIGN PATENT DOCUMENTS

| JP | 5288045 | 9/2013 |
| JP | 2016-045713 | 4/2016 |
| JP | 2016-149122 | 8/2016 |
| JP | 2019-026210 | 2/2019 |
| JP | 2021-014232 | 2/2021 |
| JP | 2021-115971 | 8/2021 |

OTHER PUBLICATIONS

Japanese Office Action for Japanese Patent Application No. 2021-181042 mailed Jun. 6, 2023.

* cited by examiner

*Primary Examiner* — Brian P Sweeney
(74) *Attorney, Agent, or Firm* — Amin, Turocy & Watson, LLP

(57) ABSTRACT

A vehicle control device includes: a recognizer configured to recognize a surrounding situation of a host vehicle; an input unit configured to receive an input operation from an occupant of the host vehicle; a controller configured to perform automatic stop control of decelerating and stopping the host vehicle when the input operation is received by the input unit; and a setter configured to perform a setting process of setting a first time after the input operation has been received by the input unit and until the automatic stop control is started by the controller. The setter is configured to change the first time based on a result of recognition of a following vehicle of the host vehicle from the recognizer in the setting process.

11 Claims, 13 Drawing Sheets

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2021-181042, filed Nov. 5, 2021, the content of which is incorporated herein by reference.

BACKGROUND

Field of the Invention

The present invention relates to a vehicle control device, a vehicle control method, and a storage medium.

Description of Related Art

Recently, various techniques of automatically stopping a vehicle which is traveling have been developed. For example, a technique of determining whether automatic stop of a vehicle is to be performed based on a surrounding environment of the vehicle has been proposed (Japanese Unexamined Patent Application, First Publication No. 2021-115971). For example, a technique of monitoring a driver's state and enabling inputting of an instruction to a receiver (a stop indicator) when an abnormality in condition of a driver has been detected has been proposed (Japanese Patent No.

SUMMARY

As described in Japanese Patent No. 5288045, when automatic stop control of a vehicle is started in response to a driver's operation, in what situation the stop indicator is to be operated can be determined by the driver. Accordingly, actually, an automatic stop function is not limited to a case in which the driver's condition is abnormal and is also used in a case in which the driver wants to stop the vehicle for another reason. However, in the related art, uniform control is performed on use of the automatic stop function for different purposes and thus a vehicle may not be appropriately stopped according to the purposes.

The present invention was made in consideration of the aforementioned circumstances and an objective thereof is to provide a vehicle control device, a vehicle control method, and a storage medium that can automatically stop a vehicle in a more appropriate mode according to an occupant's operation.

A vehicle control device, a vehicle control method, and a storage medium according to the present invention employ the following configurations.

(1) According to an aspect of the present invention, there is provided a vehicle control device including: a storage device configured to store a program; and a hardware processor, wherein the hardware processor is configured to execute the program stored in the storage device to perform: recognizing a surrounding situation of a host vehicle; receiving an input operation from an occupant of the host vehicle; performing automatic stop control of decelerating and stopping the host vehicle when the input operation is received; performing a setting process of setting a first time after the input operation has been received and until the automatic stop control is started; and changing the first time based on a result of recognition of a following vehicle of the host vehicle in the setting process.

(2) In the aspect of (1), the result of recognition of a following vehicle may be information indicating one or more of whether there is a following vehicle and the distance between the host vehicle and the following vehicle.

(3) In the aspect of (1) or (2), the hardware processor may be configured to set the first time to be longer when a following vehicle is recognized and the distance between the following vehicle and the host vehicle is less than a threshold value than when a following vehicle is not recognized or when the distance between the following vehicle and the host vehicle is equal to or greater than the threshold value.

(4) In any one of the aspects of (1) to (3), the hardware processor may be configured to further perform: performing an occupant notifying process of performing first notification for an occupant of the host vehicle using a first information output device; and starting the automatic stop control after performing the first notification for the occupant over only the first time in the occupant notifying process.

(5) In any one of the aspects of (1) to (4), the hardware processor may be configured to further perform: performing an outside notifying process of performing second notification for the outside of the host vehicle using a second information output device after the automatic stop control has started; and changing a mode of the second notification based on the result of recognition of a following vehicle in the outside notifying process.

(6) In the aspect of (5), the hardware processor may be configured to set a timing of the second notification to be later when a following vehicle is recognized and the distance between the following vehicle and the host vehicle is less than a threshold value than when a following vehicle is not recognized or when the distance between the following vehicle and the host vehicle is equal to or greater than the threshold value in the outside notifying process.

(7) In any one of the aspects of (1) to (6), the hardware processor may be configured to change a rate of deceleration of the host vehicle in the automatic stop control based on the result of recognition of a following vehicle.

(8) In any one of the aspects of (1) to (7), the hardware processor may be configured to set a rate of deceleration of the host vehicle in the automatic stop control to be less when a following vehicle is recognized and the distance between the following vehicle and the host vehicle is less than a threshold value than when a following vehicle is not recognized or when the distance between the following vehicle and the host vehicle is equal to or greater than the threshold value.

(9) In any one of the aspects of (1) to (8), the hardware processor may be configured to further perform: performing an occupant notifying process of notifying an occupant of the host vehicle using an information output device; and performing third notification for the occupant of the host vehicle in the occupant notifying process when a following vehicle is not recognized or when the distance between the following vehicle and the host vehicle is equal to or greater than a threshold value after the first time has been changed in the setting process.

(10) In any one of the aspects of (1) to (9), the hardware processor may be configured to further perform: performing an occupant notifying process of notifying an occupant of the host vehicle using an information output device; and performing third notification for the occupant of the host vehicle in the occupant notifying process when a following vehicle is not recognized or when the distance between the following vehicle and the host vehicle is equal to or greater than a threshold value after the first time has been changed in the setting process.

(11) According to an aspect of the present invention, there is provided a vehicle control method that is performed by a computer, the vehicle control method including: recognizing a surrounding situation of a host vehicle; receiving an input operation from an occupant of the host vehicle; performing automatic stop control of decelerating and stopping the host vehicle when the input operation is received; performing a setting process of setting a first time after the input operation has been received and until the automatic stop control is started; and changing the first time based on a result of recognition of a following vehicle of the host vehicle in the setting process.

(12) According to an aspect of the present invention, there is provided a non-transitory computer-readable storage medium storing a program for causing a computer to perform: recognizing a surrounding situation of a host vehicle; receiving an input operation from an occupant of the host vehicle; performing automatic stop control of decelerating and stopping the host vehicle when the input operation is received; performing a setting process of setting a first time after the input operation has been received and until the automatic stop control is started; and changing the first time based on a result of recognition of a following vehicle of the host vehicle in the setting process.

According to the aspects of (1) to (12), it is possible to automatically stop a vehicle in a more appropriate mode in response to an occupant's operation.

DESCRIPTION OF EMBODIMENTS

Hereinafter, a vehicle control device, a vehicle control method, and a storage medium according to an embodiment of the present invention will be described with reference to the accompanying drawings.

Outline

Figure 1:
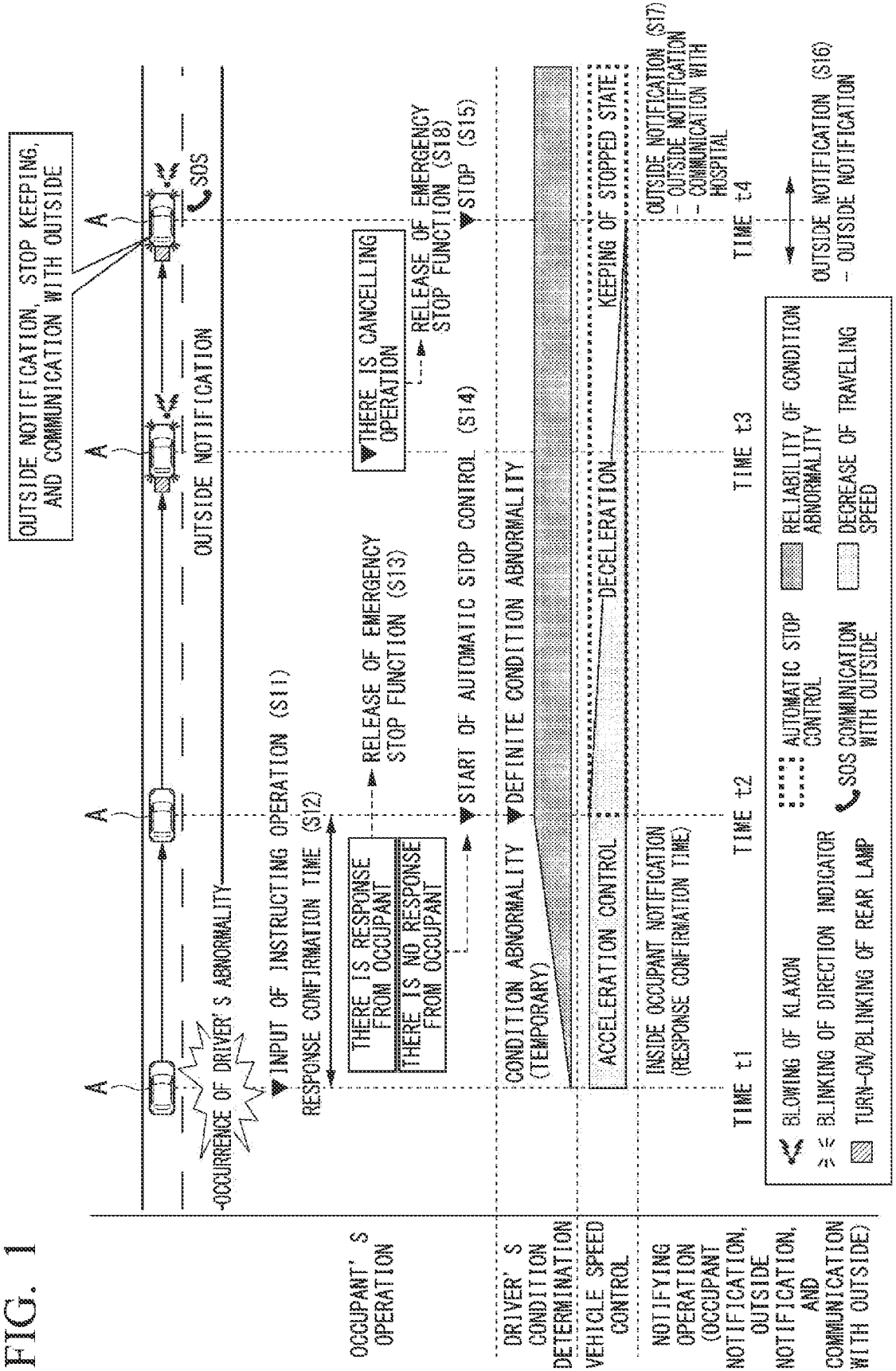
FIG. 1 is a diagram schematically illustrating a driver-abnormality emergency stop function.

FIG. 1 is a diagram schematically illustrating a driver-abnormality emergency stop function. The driver-abnormality emergency stop function is a function of automatically stopping a vehicle when an abnormality occurs in an occupant and is one driving support function. For example, a routine after an abnormality in condition has occurred in an occupant (who is a driver herein) of a host vehicle A which is traveling and until the host vehicle A stops through the driver-abnormality emergency stop function will be described below. In the following description, the driver-abnormality emergency stop function is briefly referred to as an "emergency stop function."

First, an occupant having an abnormality in condition performs an operation (hereinafter referred to as an "instructing operation") of inputting an instruction for performing the emergency stop function to an indicator provided in the host vehicle A (Step S11: time t1). In response to inputting of the instructing operation, the host vehicle A starts the emergency stop function and switches to a standby state of automatic stop control. In the standby state, the host vehicle A gives a call to the occupant in a predetermined response confirmation time (Step S12). The call to the occupant is an example of "first notification," and the response confirmation time is an example of a "first time."

Subsequently, when the occupant responds to the call of Step S12 in the response confirmation time, the host vehicle A releases the standby state of automatic stop control and ends the emergency stop function (Step S13: release of the emergency stop function). On the other hand, when the occupant does not respond to the call in the response confirmation time, the host vehicle A starts automatic stop control (Step S14: time t2). The host vehicle A decelerates through the automatic stop control and stops finally (Step S15: time t4).

The host vehicle A performs an outside notifying operation of alerting persons outside the vehicle or the like before or after the host vehicle stops through the automatic stop control (Step S16). The outside notification is an example of "second notification." When the host vehicle stops, the host vehicle A performs an outside notifying operation of notifying persons outside the vehicle, a hospital, or the like of an abnormality of the occupant (Step S17).

On the other hand, when a cancelling operation is input to the indicator after the automatic stop control has started and until the host vehicle A stops (time t3), the host vehicle A stops the automatic stop control which is being performed and ends the emergency stop function (Step S18: release of the emergency stop function).

In the standby state, acceleration of the host vehicle A can be curbed. In the standby state, the host vehicle A may recognize that the occupant is in a temporary abnormal state, increase the reliability of an abnormal state with the elapse of time, and determine that the occupant is in the abnormal state when the occupant does not respond in the response confirmation time. In this case, in the standby state, the host vehicle A may control the degree of curbing of acceleration according to the reliability of the abnormal state of the occupant.

The aforementioned flow of the emergency stop function is based on the premise that an abnormality in conditions of an occupant (a driver herein) has occurred, but in what situation the instructing operation is to be performed can be determined by the occupant when the emergency stop function operates with the instructing operation from the occupant as a trigger. Accordingly, the emergency stop function is originally considered as realizing automatic stop control when an abnormality occurs in conditions of an occupant, but may be actually used at an arbitrary timing as a simple automatic stop means of the host vehicle A.

However, even when the emergency stop function is used in various situations in this way, the emergency stop function in the related art has been uniform control regardless of situations in which it is used, and thus the host vehicle A may not be stopped at an appropriate timing. Specifically, since the emergency stop function in the related art is assumed to be used in a situation in which rapid stopping is preferable such as a case in which an abnormality occurs in conditions of an occupant, there is a likelihood that the host vehicle will not be able to decelerate when the emergency stop function is used in a situation in which slow stopping is preferable such as a situation in which there is a following vehicle. On the other hand, there is a likelihood that the emergency stop function in the related art will not provide appropriate deceleration when the emergency stop function is used in a situation in which rapider stopping is preferable than when an abnormality in conditions occurs in an occupant. Accordingly, when the emergency stop function in the related art is used, there is a likelihood that the host vehicle A will disturb a nearby traveling environment.

A vehicle control device according to an embodiment which will be described below is for solving the aforementioned problems and enables automatically stopping a vehicle in a more appropriate mode in response to an occupant's operation.

Embodiment

Entire Configuration

Figure 2:
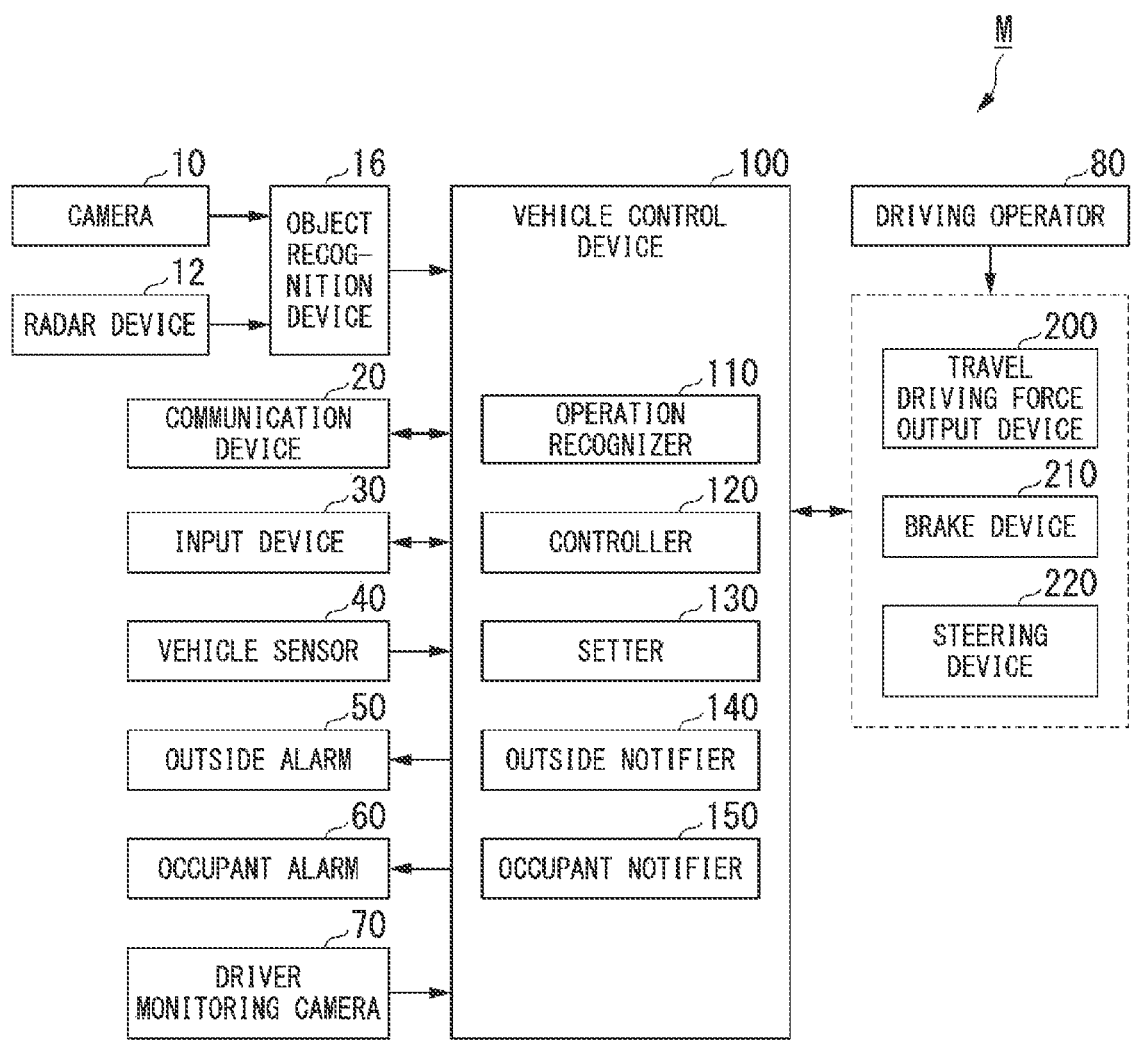
FIG. 2 is a diagram illustrating a configuration of a vehicle system employing a vehicle control device according to an embodiment.

FIG. 2 is a diagram illustrating a configuration centered on a vehicle control device 100 which is mounted in a host vehicle M according to an embodiment. The host vehicle M is, for example, a vehicle with two wheels, three wheels, or four wheels and a drive source thereof is an internal combustion engine such as a diesel engine or a gasoline engine, an electric motor, or a combination thereof. The electric motor operates using electric power generated by a power generator connected to the internal combustion engine or electric power discharged from a secondary battery or a fuel cell.

The host vehicle M includes, for example, a camera 10, a radar device 12, an object recognition device 16, a communication device 20, an input device 30, a vehicle sensor 40, an outside alarm 50, an occupant alarm 60, a driver monitoring camera 70, a driving operator 80, a vehicle control device 100, a travel driving force output device 200, a brake device 210, and a steering device 220. These devices or instruments are connected to each other via a multiplex communication line such as a controller area network (CAN) communication line, a serial communication line, a radio communication network, or the like. The configuration illustrated in FIG. 2 is only an example and a part of the configuration may be omitted or another configuration may be added thereto.

The camera 10 is, for example, a digital camera using a solid-state imaging device such as a charge coupled device (CCD) or a complementary metal oxide semiconductor (CMOS). The camera 10 is attached to an arbitrary position on the host vehicle M. When the front view of the host vehicle M is imaged, the camera 10 is attached to an upper part of a front windshield, a rear surface of a rearview mirror, or the like. The camera 10 images the surroundings of the host vehicle M, for example, periodically and repeatedly. The camera 10 may be a stereoscopic camera.

The radar device 12 radiates radio waves such as millimeter waves to the surroundings of the host vehicle M, detects radio waves (reflected waves) reflected by an object, and determines at least a position (the distance and the direction) of the object. The radar device 12 is attached to an arbitrary position on the host vehicle M. The radar device 12 may detect a position and the speed of an object using a frequency modulated continuous wave (FM-CW) method.

The object recognition device 16 recognizes a surrounding situation of the host vehicle M based on results of detection from the camera 10 or the radar device 12. The object recognition device 16 recognizes at least the distance between the host vehicle M and a following vehicle. The object recognition device 16 may recognize a position, a type, and the like of an object based on the results of detection from the camera 10 or the radar device 12. The object recognition device 16 outputs the result of recognition to the vehicle control device 100. The function of the object recognition device 16 may be provided in the vehicle control device 100. In this case, the object recognition device 16 may output the results of detection from the camera 10 and the radar device 12 to the vehicle control device 100 without any change. The object recognition device 16 may be omitted from the host vehicle M.

The communication device 20 communicates with other vehicles near the host vehicle M, for example, using a cellular network, a Wi-Fi network, Bluetooth (registered trademark), or dedicated short range communication (DSRC) or communicates with various server devices via radio base stations.

The input device 30 receives an operation from an occupant of the host vehicle M. The input device 30 includes a touch panel, buttons, switches, and keys. The input device 30 outputs a signal corresponding to an input operation to the vehicle control device 100.

The vehicle sensor 40 includes a vehicle speed sensor that determines the speed of the host vehicle M, an acceleration sensor that detects an acceleration, a yaw rate sensor that determines the angular velocity around a vertical axis, and a direction sensor that determines the direction of the host vehicle M.

The outside alarm 50 performs a predetermined notifying operation on the outside of the host vehicle M. The outside alarm 50 includes, for example, an indicator lamp or a speaker. A direction indicator may be used as the outside alarm 50. The outside alarm 50 may include a communication interface that transmits information for notification to an outside communication device. The timing at which the outside alarm 50 performs a notifying operation is controlled by the vehicle control device 100. When the outside alarm 50 can perform a plurality of notifying operations, the types of the notifying operation may be controlled by the vehicle control device 100. The outside alarm 50 is an example of a "second information output device."

The occupant alarm 60 performs a predetermined notifying operation on an occupant of the host vehicle M. The occupant alarm 60 includes, for example, a touch panel, an indicator lamp, or a speaker. The touch panel may be also used as the touch panel of the input device 30. The timing at which the occupant alarm 60 performs a notifying operation is controlled by the vehicle control device 100. When the occupant alarm 60 can perform a plurality of notifying operations, the types of the notifying operation may be controlled by the vehicle control device 100. The occupant alarm 60 is an example of a "first information output device."

The driver monitoring camera 70 is, for example, a digital camera using a solid-state imaging device such as a CCD or a CMOS. The driver monitoring camera 70 is attached to an arbitrary position on the host vehicle M in a place and a direction in which the head of an occupant (hereinafter referred to as a driver) sitting on a driver's seat of the host vehicle M can be imaged from the front (such that the face of the driver is imaged). For example, the driver monitoring camera 70 is attached to an upper part of a display device which is provided at the central part of an instrument panel of the host vehicle M.

The driving operator 80 includes, for example, a steering wheel, an accelerator pedal, a brake pedal, a shift lever, and other operators. A sensor that determines the amount of operation or performing of an operation is attached to the driving operator 80. Results of detection of the sensor are output to the vehicle control device 100 or some or all of the travel driving force output device 200, the brake device 210, and the steering device 220.

The vehicle control device 100 includes, for example, an operation recognizer 110, a controller 120, a setter 130, an outside notifier 140, and an occupant notifier 150. These elements are realized, for example, by causing a hardware processor such as a central processing unit (CPU) to execute a program (software). Some or all of such elements may be realized by hardware (which includes circuitry) such as a large scale integration (LSI), an application-specific integrated circuit (ASIC), or a field-programmable gate array (FPGA), or a graphics processing unit (GPU) or may be realized in cooperation of software and hardware. The program may be stored in a storage device such as an HDD or a flash memory (a storage device including a non-transitory storage medium) of the vehicle control device 100 in advance, or may be stored in a removable storage medium such as a DVD or a CD-ROM and installed in the HDD or the flash memory of the vehicle control device 100 by setting the removable storage medium (non-transitory storage medium) to a drive device.

The operation recognizer 110 recognizes details of an operation which has been performed on the input device 30 based on an output signal of the input device 30. The input device 30 includes a touch panel, switches, and keys. For example, the operation recognizer 110 recognizes an operation of inputting an instruction to perform the emergency stop function (hereinafter referred to as an "instructing operation") and an operation of ending the emergency stop function in execution or cancelling an instruction to perform the emergency stop function (hereinafter referred to as a "cancelling operation"). As described above, the emergency stop function is a function of calling an occupant and automatically decelerating and stopping the host vehicle M when the occupant does not respond to the call. The instructing operation and the cancelling operation may be any operations as long as they can be distinguished by an operation performed on the input device 30. For example, the operation recognizer 110 may recognize an operation of turning on a switch as the instructing operation and recognize an operation of turning off the switch as the cancelling operation. The operation recognizer 110 is an example of an "input unit" and an "input canceller," and the instructing operation is an example of an "input operation."

The controller 120 performs a control process for realizing various support functions associated with driving of the host vehicle M based on results of recognition near the host vehicle M from the object recognition device 16, results of detection of the host vehicle M from the vehicle sensor 40, an image of a driver captured by the driver monitoring camera 70, and the like. For example, the controller 120 has a function of controlling the emergency stop function in addition to a driving support function such as lane keeping or lane change. Specifically, the controller 120 performs control for automatically stopping the host vehicle M (hereinafter referred to as "automatic stop control") when an operation of instructing performance of the emergency stop function is input. Specifically, the controller 120 first calls an occupant and starts automatic stop control when the occupant does not respond to the call within a predetermined time. The controller 120 ends the automatic stop control when the cancelling operation is input while the automatic stop control is being performed.

The setter 130 sets a response confirmation time corresponding to a situation of a following vehicle of the host vehicle M for the controller 120 when an operation of instructing performance of the emergency stop function is input. The response confirmation time is a time in which the controller 120 waists for a response from an occupant in response to a call given to the occupant in the emergency stop function. That is, the controller 120 starts the automatic stop control when there is no response from the occupant in the response confirmation time set by the setter 130.

The setter 130 has a function of setting a timing at which outside notification is performed in addition to setting the response confirmation time. As described above, the outside notification which is performed along with the emergency stop function includes notification which is performed after the host vehicle has stopped such as communication with a hospital and notification which is performed before the host vehicle stops such as vehicle outside notification. The setter 130 has a function of setting the timing at which the outside notification is performed before the host vehicle stops out of such outside notifications. For example, the setter 130 sets a waiting time after the automatic stop control has been started and until the outside notification is performed for the outside notifier 140.

The outside notifier 140 causes the outside alarm 50 to perform a predetermined notifying operation at a predetermined timing. The outside notifier 140 may cause the outside alarm 50 to perform different notifying operations depending on an event to be notified or the timing of notification when the outside alarm 50 can perform a plurality of notifying operations.

The occupant notifier 150 causes the occupant alarm 60 to perform a predetermined notifying operation at a predetermined timing. The occupant notifier 150 may cause the occupant alarm 60 to perform different notifying operations depending on an event to be notifier or the timing of notification when the occupant alarm 60 can perform a plurality of notifying operations.

The travel driving force output device 200 outputs a travel driving force (a torque) for allowing a vehicle to travel to driving wheels. The travel driving force output device 200 includes, for example, a combination of an internal combustion engine, an electric motor, and a transmission and an electronic control unit (ECU) that controls them. The ECU controls the elements based on information input from the controller 120 or information input from the driving operator 80.

The brake device 210 includes, for example, a brake caliper, a cylinder that transmits a hydraulic pressure to the brake caliper, an electric motor that generates a hydraulic pressure in the cylinder, and a brake ECU. The brake ECU controls the electric motor based on the information input from the controller 120 or the information input from the driving operator 80 such that a brake torque based on a braking operation is output to vehicle wheels. The brake device 210 may include a mechanism for transmitting a hydraulic pressure generated by an operation of the brake pedal included in the driving operator 80 to the cylinder via a master cylinder as a backup. The brake device 210 is not limited to the above-mentioned configuration, and may be an electronically controlled hydraulic brake device that controls an actuator based on information input from the controller 120 such that the hydraulic pressure of the master cylinder is transmitted to the cylinder.

The steering device 220 includes, for example, a steering ECU and an electric motor. The electric motor changes the direction of turning wheels, for example, by applying a force to a rack-and-pinion mechanism. The steering ECU drives the electric motor based on the information input from the controller 120 or the information input from the driving operator 80 to change the direction of the turning wheels.

Figure 3:
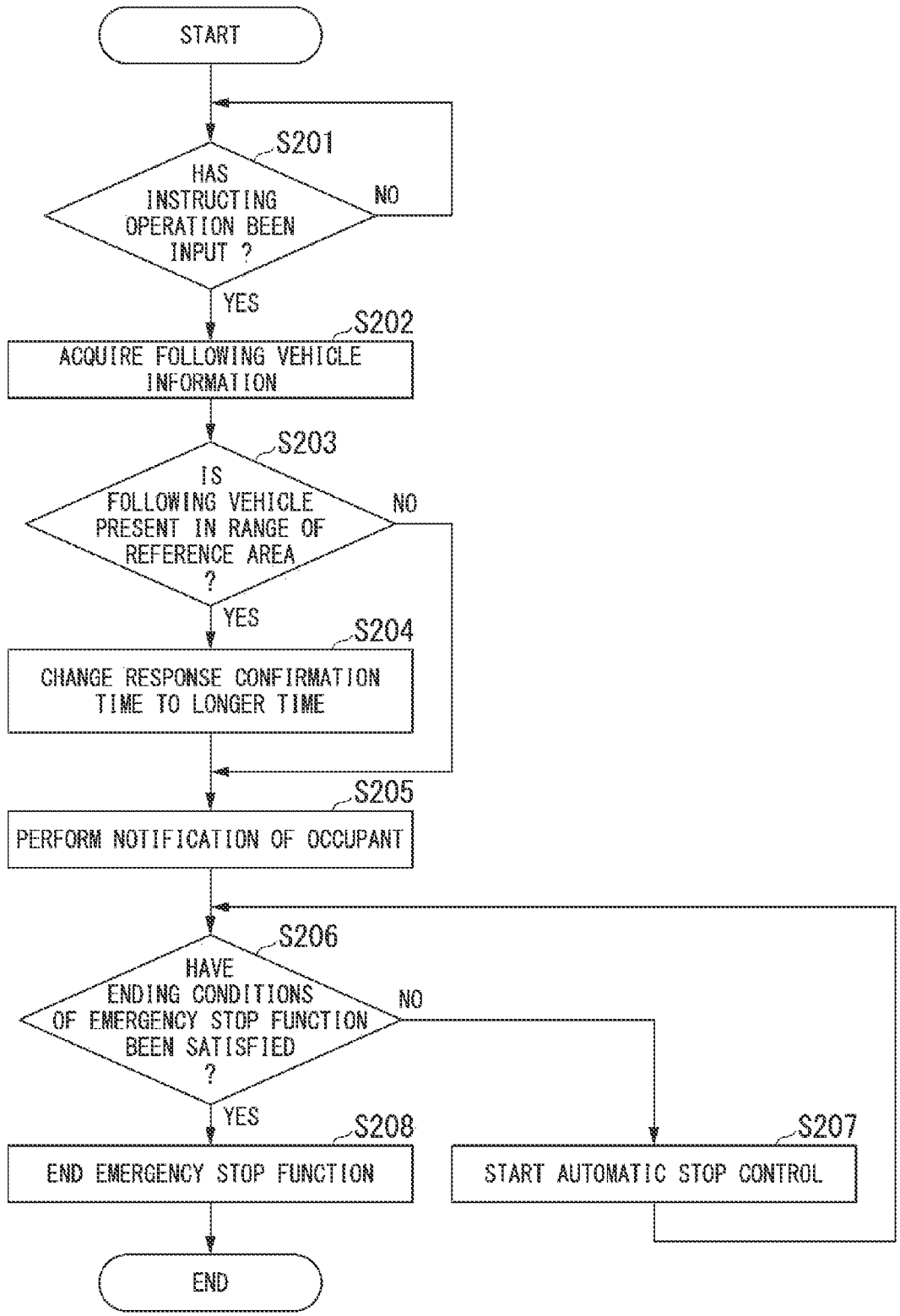
FIG. 3 is a flowchart illustrating an example of a routine of processes which are performed by the vehicle control device according to the embodiment to realize the driver-abnormality emergency stop function.

FIG. 3 is a flowchart illustrating an example of a routine in which the vehicle control device 100 according to the embodiment realizes an emergency stop function. First, the operation recognizer 110 determines whether an instructing operation has been input to the input device 30 based on an output signal of the input device 30 (Step S201). When it is determined that an instructing operation has not been input, the operation recognizer 110 repeatedly performs Step S201 until an instructing operation is input. On the other hand, when it is determined in Step S201 that an instructing operation has been input, the setter 130 acquires following vehicle information based on the results of recognition from the object recognition device 16 (Step S202). The following vehicle information includes at least information indicating whether there is a following vehicle and the distance between the host vehicle M and the following vehicle when there is a following vehicle.

Subsequently, the setter 130 determines whether a following vehicle is present in a range of a reference area based on the acquired following vehicle information (Step S203). The reference area is an area including from a position of the host vehicle M to a position of a prescribed distance behind the host vehicle M. That is, the setter 130 determines that a following vehicle is present in the reference area when a following vehicle has been recognized and the distance between the following vehicle and the host vehicle M is less than a threshold value and determines that a following vehicle is not present in the reference area when a following vehicle has not been recognized or when the distance between a following vehicle and the host vehicle M is equal to or greater than the threshold value. When it is determined that a following vehicle is present in the range of the reference area, the setter 130 changes the response confirmation time to a longer time (Step S204), and then the routine proceeds to Step S205. On the other hand, when it is determined in Step S203 that a following vehicle is not present in the range of the reference area, the setter 130 does not change the response confirmation time, and the routine proceeds to Step S205.

Subsequently, in Step S205, the occupant notifier 150 starts notification of an occupant using the occupant alarm 60 (Step S205). After the occupant notifier 150 has started notification of the occupant, the controller 120 determines whether ending conditions of the emergency stop function have been satisfied (Step S206). The ending conditions of the emergency stop function include, for example, (1) a condition that an occupant responds to a call within the response confirmation time, (2) a condition that a cancelling operation is input while the automatic stop control is being performed, (3) a condition that the host vehicle M has stopped, and (4) a condition that the automatic stop control has ended. When it is determined that none of the ending conditions of the emergency stop function have been satisfied, the controller 120 starts the automatic stop control (Step S207), and then the routine returns to Step S206. When the automatic stop control has started already while Step S206 is performed, the controller 120 skips Step S207 and the routine proceeds to Step S206. On the other hand, when it is determined in Step S206 that an ending condition of the emergency stop function has been satisfied, the controller 120 ends the emergency stop function (Step S208).

Through this series of processes, the vehicle control device 100 according to the embodiment can set the response confirmation time in a situation in which a following vehicle is present in the range of the reference area to be longer than the response confirmation time in a situation in which a following vehicle is not present in the range of the reference area. This means that a longer acceleration curbing period is provided until the host vehicle M starts the automatic stop control. Accordingly, the vehicle control device 100 according to this embodiment can stop the host vehicle M more slowly when the automatic stop control is performed in the situation in which a following vehicle is present in the range of the reference area than in the situation in which a following vehicle is not present in the range of the reference area.

Control examples of the emergency stop function which is performed by the vehicle control device 100 according to the embodiment will be described below.

First Control Example

Figure 4:
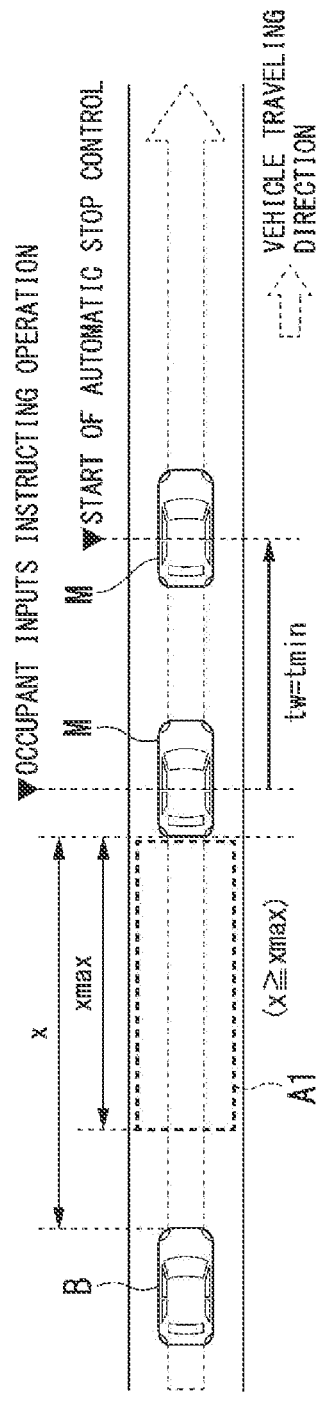
FIG. 4 is a first diagram illustrating a first control example.
Figure 5:
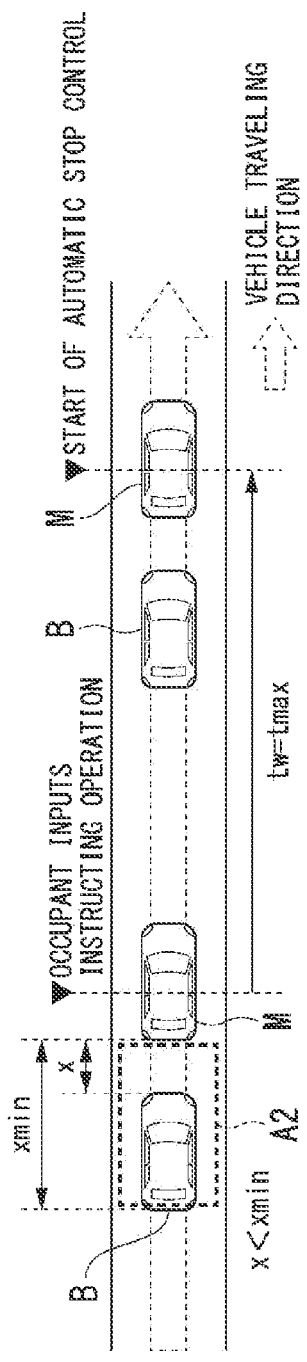
FIG. 5 is a second diagram illustrating the first control example.
Figure 6:
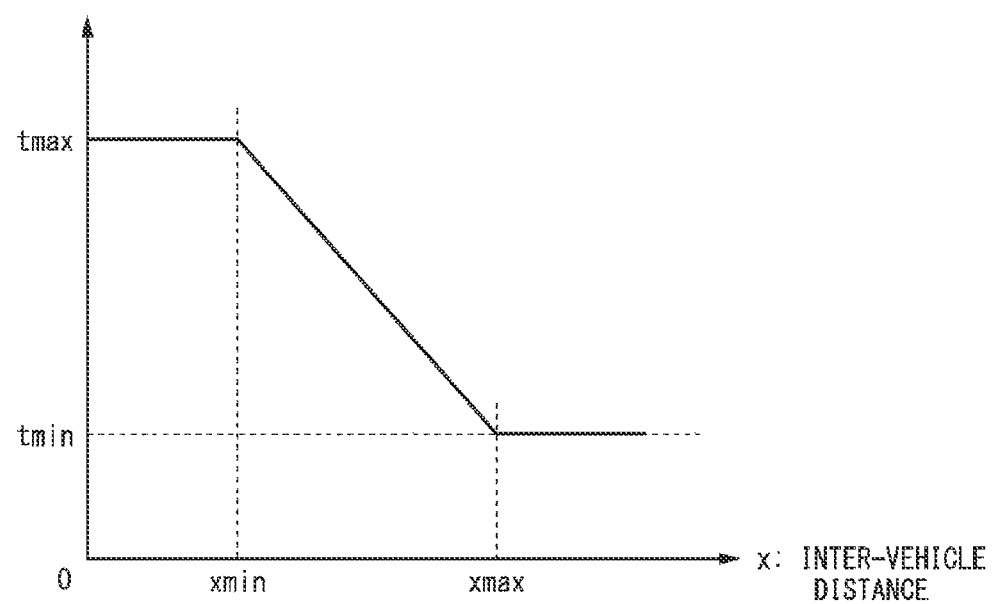
FIG. 6 is a diagram illustrating an example of a response confirmation time in the first control example.
Figure 7:
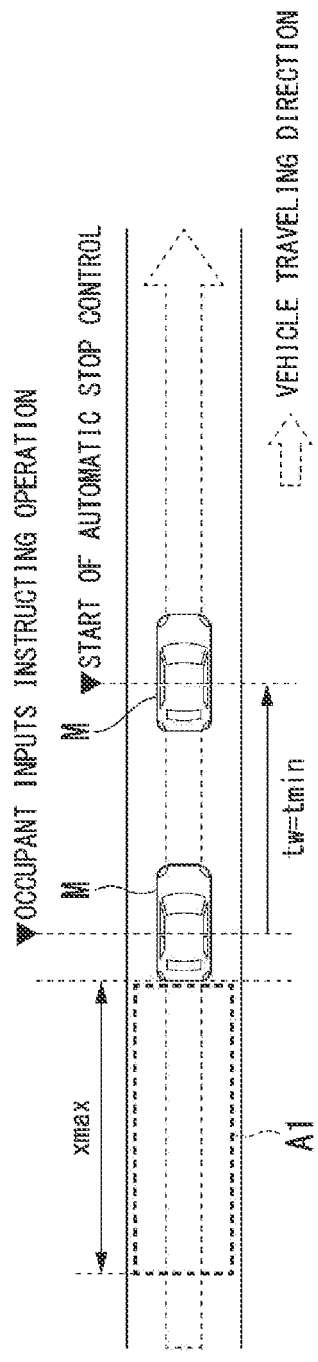
FIG. 7 is a third diagram illustrating the first control example.

FIGS. 4 to 7 are diagrams illustrating a first control example. The first control example is control for advancing start of automatic stop control by shortening the response confirmation time when a following vehicle B is far from the host vehicle M and delaying start of automatic stop control by extending the response confirmation time when a following vehicle B is close to the host vehicle M. FIG. 4 illustrates a case in which a response confirmation time tw is set to a prescribed minimum value tmin when an inter-vehicle distance x between the host vehicle M and the following vehicle B is equal to or greater than an upper limit xmax. FIG. 5 illustrates a case in which the response confirmation time tw is set to a prescribed maximum value tmax when the inter-vehicle distance x is less than a lower limit xmin. In the example illustrated in FIGS. 4 and 7, area A1 denotes a maximum range of the reference area. In the example illustrated in FIG. 5, area A2 denotes a minimum range of the reference area.

FIG. 6 illustrates a case in which the length of the response confirmation time tw changes linearly in a range from the minimum value tmin to the maximum value tmax as for the inter-vehicle distance x less than the upper limit xmax and equal to or greater than the lower limit xmin. In this case, the response confirmation time tw can be expressed as a function of the inter-vehicle distance x by Expression (1).

$$tw = \begin{cases} t\min & (x \geq x\max) \\ t\min + Gx(t\max - t\min) & (x\min \leq x < x\max) \\ t\max & (x < x\min) \end{cases} \quad (1)$$

Here, xmin denotes an inter-vehicle distance at which the maximum value tmax of the response confirmation time is set, and xmax denotes an inter-vehicle distance at which the minimum value tmin of the response confirmation time is set. For example, slower stopping is preferable in a situation in which an occupant subjected to tailgating intends to stop the host vehicle M using automatic stop control for the purpose of avoidance of a risk. Accordingly, when this situation is assumed, it is conceivable that a sufficiently short inter-vehicle distance with which a following vehicle B can be determined to be performing tailgating behind the host vehicle M be set as the minimum value xmin. For example, rapider stopping is preferable in a situation in which an occupant intends to stop the host vehicle M due to an abnormality in conditions using automatic stop control. Accordingly, when this situation is assumed, a sufficiently long inter-vehicle distance with which automatic stop control can be determined to start after the shortest response confirmation time is set as the maximum value xmax. Regarding the inter-vehicle distance increasing (or decreasing) in the range from the minimum value xmin to the maximum value xmax, the emergency stop function can be adopted to different situations of use by shortening (extending) the response confirmation time according to the inter-vehicle distance. The rate of increase or decrease of the response confirmation time with respect to the inter-vehicle distance can be adjusted based on a gain G (a fixed value) in Expression (1).

As illustrated in FIG. 7, when a following vehicle B is not present behind the host vehicle M, the inter-vehicle distance x can be set to a sufficiently large value (x xmax) such that the response confirmation time is tmin. Here, the "case in which the inter-vehicle distance between the host vehicle M and a following vehicle B is equal to or greater than the threshold value" or the "case in which a following vehicle B is not present behind the host vehicle M" is synonymous with the "case in which a following vehicle B is not present in the range of the reference area." Accordingly, the control example illustrated in FIGS. 4 and 7 can be replaced with an example in which the response confirmation time is set to be shorter in the "case in which a following vehicle B is not present in the range of the reference area" than in the case in which a following vehicle B is present in the range of the reference area.

An example in which the response confirmation time is expressed by a linear function of the inter-vehicle distance has been described above, but a part or all of the function indicating the response confirmation time may be expressed by a higher-order function of the inter-vehicle distance. The response confirmation time is set to a value varying continuously according to the inter-vehicle distance, but the response confirmation time may be set to a value varying discretely according to the inter-vehicle distance. For example, one threshold value xth may be provided for the inter-vehicle distance and the response confirmation time may be provided such that the response confirmation time is t11 at the inter-vehicle distance equal to or greater than xth and is t12 ($>$t11) at the inter-vehicle distance less than xth. That is, this is a case in which xmin and xmax become infinitely close in FIG. 6.

Second Control Example

Figure 8:
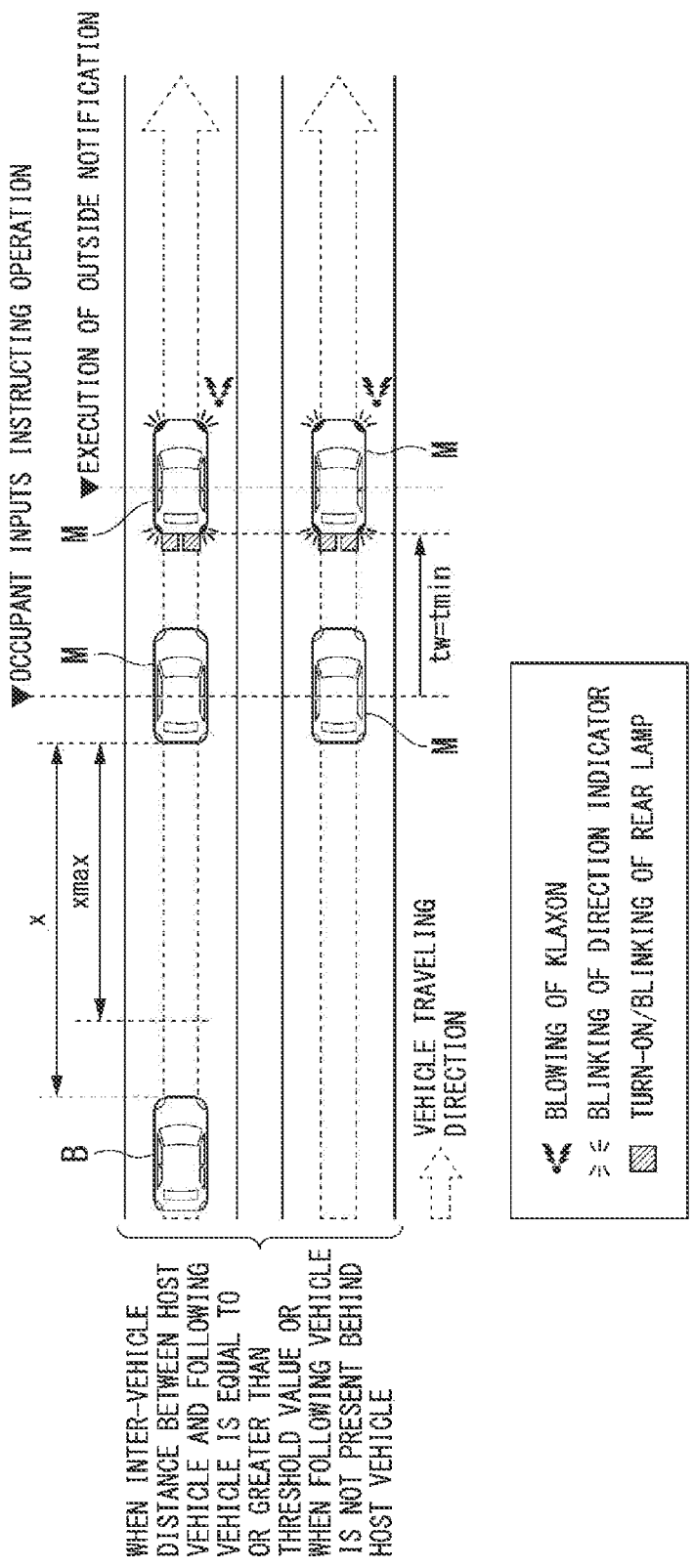
FIG. 8 is a first diagram illustrating a second control example.
Figure 9:
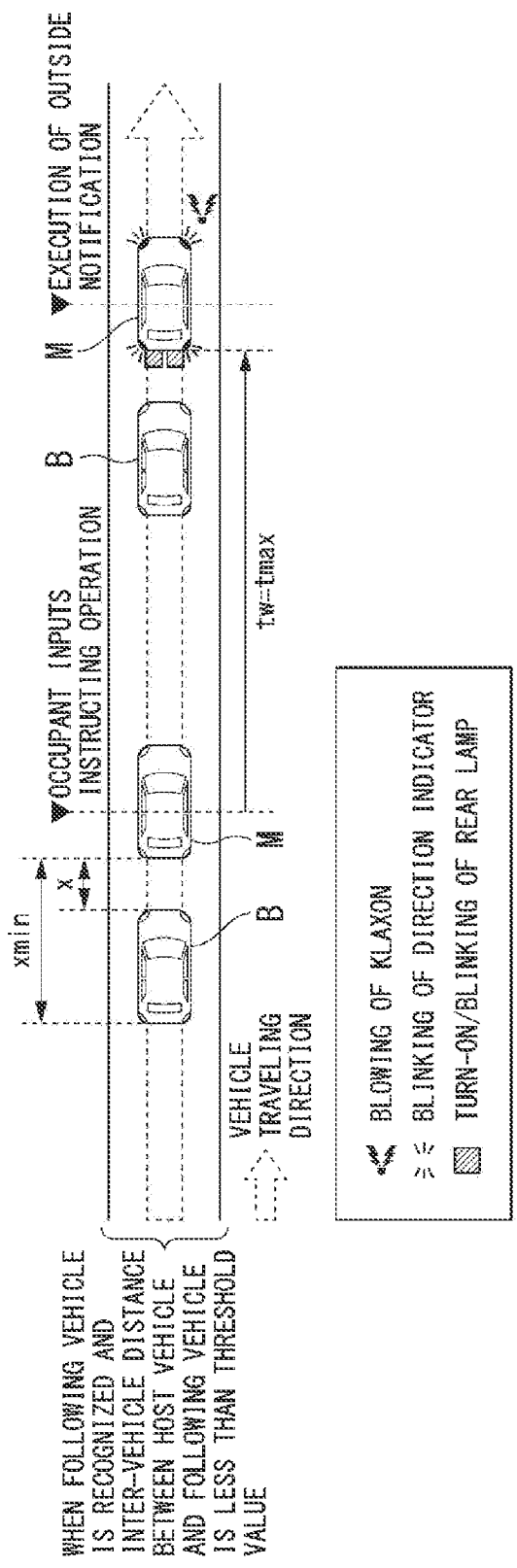
FIG. 9 is a second diagram illustrating the second control example.

FIGS. 8 and 9 are diagrams illustrating a second control example. The second control example is control for changing a timing of outside notification according to a situation of a following vehicle B while automatic stop control is being performed. As described above in the first control example, the vehicle control device 100 gives a priority to rapid stopping of the host vehicle M and brings forward the start timing of automatic stop control when the inter-vehicle distance between the host vehicle M and the following vehicle B is sufficiently large as illustrated in FIG. 4 or when a following vehicle B is not present behind the host vehicle M as illustrated in FIG. 7. In this case, from the point of view of relief of an occupant, it is preferable that outside notification be rapidly performed with performing of the automatic stop control.

On the other hand, the vehicle control device 100 gives a priority to safe stopping of the host vehicle M and delays the start timing of the automatic stop control when the inter-vehicle distance between the host vehicle M and a following vehicle B is less than the threshold value as illustrated in FIG. 5. In this case, from a point of view of an influence on the following vehicle B, it may be preferable that rapidly performing outside notification be avoided. For example, when outside notification is rapidly performed in a situation in which the following vehicle B tailgates behind the host vehicle M, there is a likelihood that it will stimulate a driver of the following vehicle B to increase a degree of risk.

Therefore, the vehicle control device 100 according to this embodiment is configured to bring forward the timing at which outside notification is performed when the inter-vehicle distance between the host vehicle M and a following vehicle B is equal to or greater than the threshold value or when a following vehicle B is not present behind the host vehicle M, that is, when a following vehicle B is not present in the range of the reference area compared with when the inter-vehicle distance between the host vehicle M and a following vehicle B is less than the threshold value, that is, when a following vehicle B is present in the range of the reference area. The vehicle control device 100 is configured to delay the timing at which outside notification is performed when a following vehicle B is present in the range of the reference area compared with when a following vehicle B is not present in the range of the reference area.

By performing this timing control of outside notification, stopping of the host vehicle M can be more safely performed using automatic stop control when a following vehicle B is present near the host vehicle M. When a following vehicle B is not present near the host vehicle M, the outside of the host vehicle M can be rapidly notified of an abnormality of an occupant of the host vehicle M.

In the example illustrated in FIGS. 8 and 9, outside notification is performed after the response confirmation time has elapsed, but the present invention is not limited to the example, and outside notification may be performed before the response confirmation time elapses as long as an occupant has input an instructing operation.

Third Control Example

Figure 10:
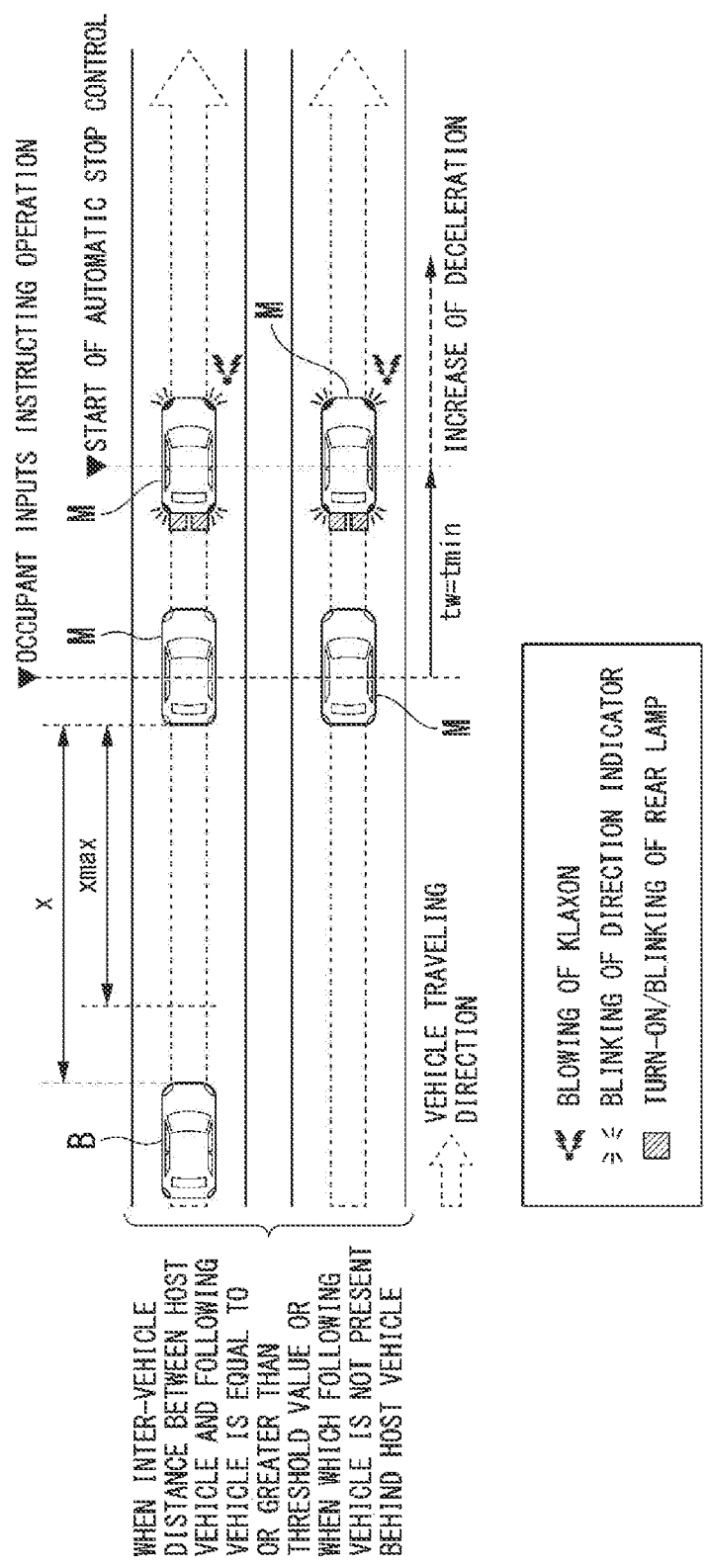
FIG. 10 is a first diagram illustrating a third control example.
Figure 11:
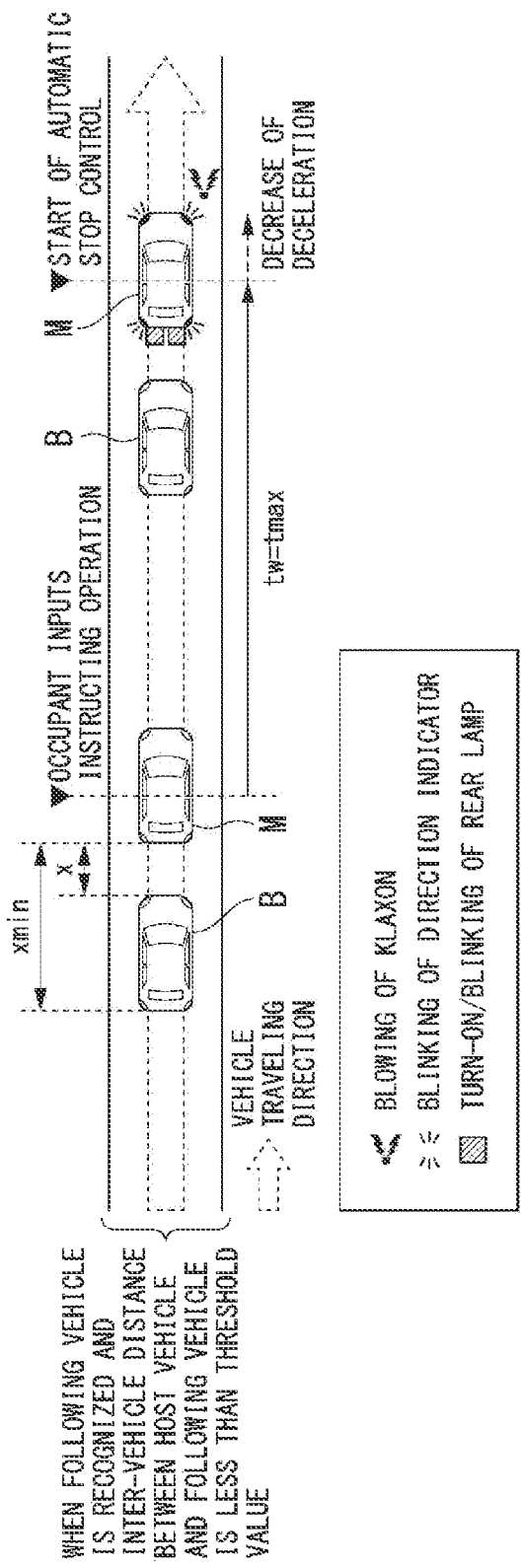
FIG. 11 is a second diagram illustrating the third control example.

FIGS. 10 and 11 are diagrams illustrating a third control example. The third control example is control for changing a rate of deceleration of the host vehicle M according to a situation of a following vehicle B while automatic stop control is being performed. As described above in the first control example, the vehicle control device 100 brings forward the start timing of automatic stop control when the inter-vehicle distance between the host vehicle M and a following vehicle B is sufficiently large as illustrated in FIG. 4 or when a following vehicle B is not present behind the host vehicle M as illustrated in FIG. 7. From a point of view of relief of an occupant, this is for giving a priority to rapid stopping of the host vehicle M, but it is preferable that the rate of deceleration is set to be higher than the rate of deceleration while automatic stop control is being performed for the purpose of rapidly stopping the host vehicle M.

On the other hand, the vehicle control device 100 delays the start timing of the automatic stop control when the inter-vehicle distance between the host vehicle M and a following vehicle B is less than the threshold value as illustrated in FIG. 5. From a point of view of safe stopping of the host vehicle M, this is for extending the response confirmation time and slowly decelerating the host vehicle M, but it is preferable that the rate of deceleration be set to be lower than the rate of deceleration while automatic stop control is being performed for the purpose of slowly stopping the host vehicle M.

Therefore, the vehicle control device 100 according to this embodiment is configured to increase the rate of deceleration of the host vehicle M while automatic stop control is being performed when a following vehicle B is not present in the range of the reference area in comparison with a case in which a following vehicle B is present in the range of the reference area. The vehicle control device 100 is configured to decrease the rate of deceleration of the host vehicle M while automatic stop control is being performed when a following vehicle B is present in the range of the reference area in comparison with a case in which a following vehicle B is not present in the range of the reference area.

By performing this control of the rate of deceleration while automatic stop control is being performed, stopping of the host vehicle M can be more safely performed using automatic stop control when a following vehicle B is present near the host vehicle M. When a following vehicle B is not present near the host vehicle M, the host vehicle M can be more rapidly stopped.

Fourth Control Example

Figure 12:
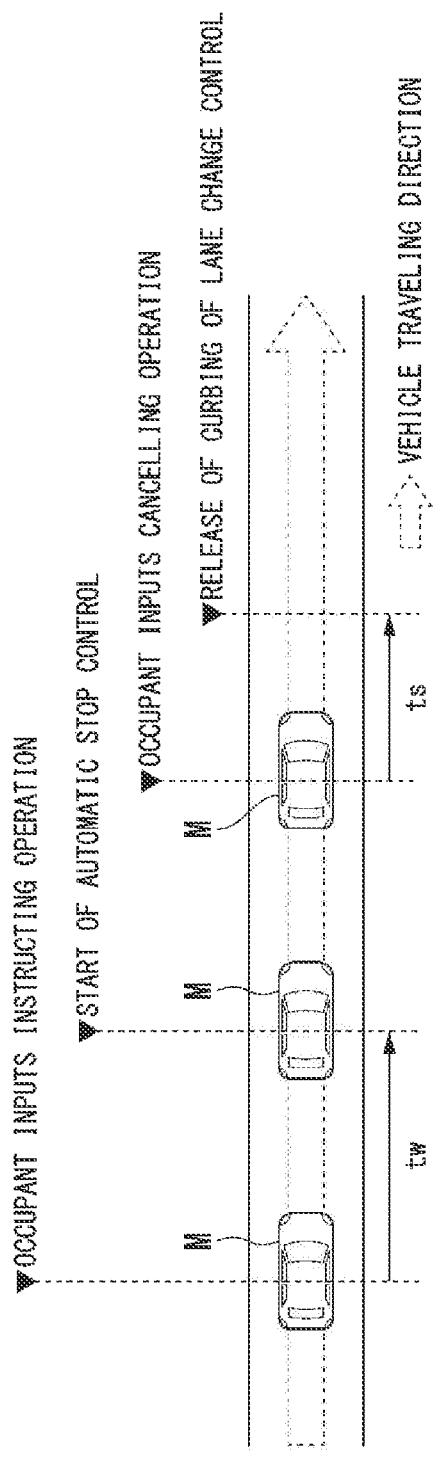
FIG. 12 is a diagram illustrating a fourth control example.

FIG. 12 is a diagram illustrating a fourth control example. The fourth control example is control for curbing execution of some driving support functions when a cancelling operation is input while automatic stop control is being performed. As illustrated in FIG. 1, when an occupant inputs a cancelling operation while automatic stop control is being performed using the emergency stop function, the vehicle control device 100 releases the emergency stop function. However, even when the occupant can input a cancelling operation, all operations required for driving may not be able to be performed. There is also a likelihood that an occupant will input a cancelling operation through an unintentional operation.

Therefore, the vehicle control device 100 according to the embodiment is configured to curb execution of some driving support functions in a predetermined function curbing time ts when a cancelling operation is input while automatic stop control is being performed. Some driving support functions to be curbed may be any as long as they require an occupant's approval. FIG. 12 illustrates a case in which a lane change function is curbed as an example. In the example illustrated in FIG. 12, when inputting of a cancelling operation is recognized by the operation recognizer 110, the controller 120 starts curbing of the lane change function at the timing at which the cancelling operation is input and releases curbing of the lane change function at a timing at which the function curbing time ts has elapsed from the timing.

In this way, by curbing some driving support functions requiring an occupant's approval in the function curbing time ts when a cancelling operation is input, it is possible to enhance traveling safety of the host vehicle M when the emergency stop function is released. Here, the function curbing time ts is an example of a "second time."

Fifth Control Example

Figure 13:
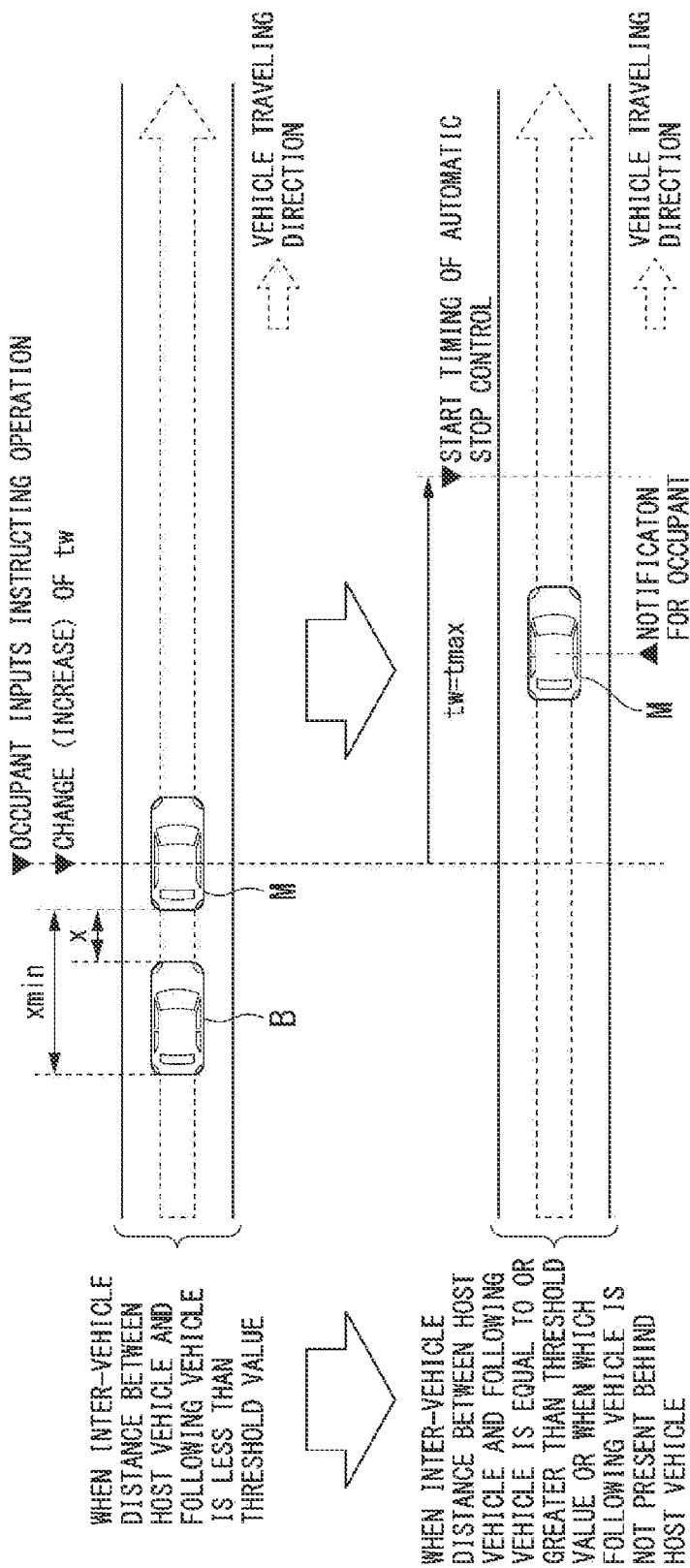
FIG. 13 is a diagram illustrating a fifth control example.

FIG. 13 is a diagram illustrating a fifth control example. The fifth control example is control for notifying an occupant of the host vehicle M when a recognition state of a following vehicle B has changed after the response confirmation time has changed. In the following description, this notification is referred to as "third notification." As described above, when a following vehicle B in the range of the reference area is recognized at the time of starting of the emergency stop function, the vehicle control device 100 according to the embodiment sets the response confirmation time to be longer than when a following vehicle B is not recognized in the range of the reference area. However, a case in which a following vehicle B present near the host vehicle M at the time of starting of the emergency stop function disappears from near the host vehicle M is conceivable thereafter. In this case, even when a following vehicle B is not present near the host vehicle M, starting of automatic stop control is delayed or stopping of the host vehicle M is delayed by performing slow deceleration.

Therefore, the vehicle control device 100 according to the embodiment is configured to perform third notification for an occupant of the host vehicle M when a following vehicle B has not been recognized in the range of the reference area after the response confirmation time has changed based on recognition of the following vehicle B in the range of the reference area at the time of starting of emergency stop function. For example, the third notification may be display of a message or output of voice with details such as "the tailgating vehicle (following vehicle B) has disappeared."

By performing the third notification for the occupant, the occupant can determine whether the emergency stop function is continuously performed according to the recognition state of the following vehicle B. For example, when the third notification is performed in the response confirmation time, the occupant can release the emergency stop function by receiving that the following vehicle B has disappeared and responding to a call. For example, when the third notification is performed after the response confirmation time has expired and automatic stop control has started, the occupant can release the emergency stop function by receiving that the following vehicle B has disappeared and inputting a cancelling operation.

With the aforementioned vehicle control device 100, it is possible to automatically stop a vehicle in a more appropriate mode in response to an occupant's operation.

Modified Examples

In the aforementioned embodiment, the vehicle control device 100 controls the driving support function of the host vehicle M, but the vehicle control device 100 may have an automatic driving function. In this case, the driving support function including the emergency stop function may be provided as a part of the automatic driving control or may be provided to be usable as a single driving support function. The emergency stop function may be provided to operate in parallel with or in cooperation with another driving support function such as lane keeping control.

In the aforementioned embodiment, a case in which the host vehicle stops on a traveling road is assumed as an example of automatic stop control, but the vehicle control device 100 may be configured to stop the host vehicle M on a road side after sufficiently decelerating the host vehicle M. In this case, the vehicle control device 100 may be configured to determine a stoppable position in cooperation with a car navigation system or the like.

In the vehicle control device 100 according to the aforementioned embodiment, the emergency stop function according to the first control example may be mounted as an essential function, and the emergency stop functions according to the second to fifth control examples may be mounted as optional functions to be selected.

While the present invention has been described with reference to an embodiment, the present invention is not limited to the embodiment, and various modifications and replacements can be added thereto without departing from the gist of the present invention.

What is claimed is:

1. A vehicle control device comprising:
a storage device configured to store a program; and
a hardware processor,
wherein the hardware processor is configured to execute the program stored in the storage device to perform:
recognizing a surrounding situation of a host vehicle based on a detection results of a camera, a radar device, or both mounted on the host vehicle;
receiving an input operation from an occupant of the host vehicle;
performing automatic stop control of decelerating and stopping the host vehicle when the input operation is received;
performing a setting process of setting a first time after the input operation has been received and until the automatic stop control is started;
changing the first time based on a result of recognition of a following vehicle of the host vehicle in the setting process; and
setting the first time to be longer when the following vehicle is recognized and a distance between the following vehicle and the host vehicle is less than a threshold value than when the following vehicle is not recognized or when the distance between the following vehicle and the host vehicle is equal to or greater than the threshold value.

2. The vehicle control device according to claim 1, wherein the result of recognition of a following vehicle is information indicating one or more of whether there is a following vehicle and a distance between the host vehicle and the following vehicle.

3. The vehicle control device according to claim 1, wherein the hardware processor is configured to further perform:
performing an occupant notifying process of performing first notification for an occupant of the host vehicle using a first information output device; and
starting the automatic stop control after performing the first notification for the occupant over only the first time in the occupant notifying process.

4. The vehicle control device according to claim 1, wherein the hardware processor is configured to further perform:
performing an outside notifying process of performing second notification for the outside of the host vehicle using a second information output device after the automatic stop control has started; and
changing a mode of the second notification based on the result of recognition of a following vehicle in the outside notifying process.

5. The vehicle control device according to claim 4, wherein the hardware processor is configured to set a timing of the second notification to be later when a following vehicle is recognized and a distance between the following vehicle and the host vehicle is less than a threshold value than when a following vehicle is not recognized or when the distance between the following vehicle and the host vehicle is equal to or greater than the threshold value in the outside notifying process.

6. The vehicle control device according to claim 1, wherein the hardware processor is configured to change a rate of deceleration of the host vehicle in the automatic stop control based on the result of recognition of a following vehicle.

7. The vehicle control device according to claim 1, wherein the hardware processor is configured to set a rate of deceleration of the host vehicle in the automatic stop control to be less when a following vehicle is recognized and a distance between the following vehicle and the host vehicle is less than a threshold value than when a following vehicle is not recognized or when the distance between the following vehicle and the host vehicle is equal to or greater than the threshold value.

8. The vehicle control device according to claim 1, wherein the hardware processor is configured to further perform:
performing an input cancelling process of cancelling the input operation when a predetermined operation of the occupant is detected; and
curbing a driving support function requiring an approval of the occupant until a second time elapses after the cancelling of the input operation.

9. The vehicle control device according to claim 1, wherein the hardware processor is configured to further perform:
performing an occupant notifying process of notifying an occupant of the host vehicle using an information output device; and
performing third notification for the occupant of the host vehicle in the occupant notifying process when a following vehicle is not recognized or when a distance between the following vehicle and the host vehicle is equal to or greater than a threshold value after the first time has been changed in the setting process.

10. A vehicle control method that is performed by a computer, the vehicle control method comprising:
recognizing a surrounding situation of a host vehicle based on a detection results of a camera, a radar device, or both mounted on the host vehicle;
receiving an input operation from an occupant of the host vehicle;
performing automatic stop control of decelerating and stopping the host vehicle when the input operation is received;
performing a setting process of setting a first time after the input operation has been received and until the automatic stop control is started;
changing the first time based on a result of recognition of a following vehicle of the host vehicle in the setting process; and
setting the first time to be longer when the following vehicle is recognized and a distance between the following vehicle and the host vehicle is less than a threshold value than when the following vehicle is not recognized or when the distance between the following vehicle and the host vehicle is equal to or greater than the threshold value.

11. A non-transitory computer-readable storage medium storing a program for causing a computer to perform:
recognizing a surrounding situation of a host vehicle based on a detection results of a camera, a radar device, or both mounted on the host vehicle;
receiving an input operation from an occupant of the host vehicle;
performing automatic stop control of decelerating and stopping the host vehicle when the input operation is received;
performing a setting process of setting a first time after the input operation has been received and until the automatic stop control is started;
changing the first time based on a result of recognition of a following vehicle of the host vehicle in the setting process; and
setting the first time to be longer when the following vehicle is recognized and a distance between the following vehicle and the host vehicle is less than a threshold value than when the following vehicle is not recognized or when the distance between the following vehicle and the host vehicle is equal to or greater than the threshold value.

\* \* \* \* \*